Patented July 30, 1940

2,209,454

UNITED STATES PATENT OFFICE 2,209,454

GERMICIDE

Howard L. Guest, Oakland, Calif.

No Drawing. Application December 19, 1938,
Serial No. 246,673

4 Claims. (Cl. 167—14)

This invention relates to germicides, and has for one of its objects, a germicidal product that is non-caustic and non-injurious to body tissue, and non-toxic in any degree of concentration, and which product is healing to injured tissue.

Another object is a germicidal product of the above character that is non-corrosive and is considerably more germicidal than phenol and other caustic germicides, and does not require diluting to the degree as is required to render phenol or other caustic germicides safe for use on human tissue.

A still further object is an improved non-caustic germicide which, in relatively high dilution, will rapidly and positively kill micro-organisms having a resistance to killing at least equal to that of Eberthella typhosa, Staphylococcus aures, or Tricophyton tonsurans without injury to body tissue, and which germicide, at the same time, will promote healing of broken, cut or injured tissue.

Other objects and advantages will appear in the following explanation and description.

Before describing my germicide, it is to be clearly understood that the word "germicide" in the description and claims, does not refer to antiseptics that are merely disinfectants or deodorizers, but instead, to a product suitable for application to human tissue without injury thereto, and which product will positively kill micro-organisms that are most resistant to killing, such as Eberthella typhosa, Staphylococcus aures, or Trycophyton, or the like, within a sufficiently short time after application to the micro-organisms to be effective for destroying the growth.

From extensive tests by established methods, it has been determined that my germicide diluted 1:60 in a dilution of one part to 60 parts of water, has a killing strength over six times greater than a 5% phenol solution, which phenol solution is considered to be its minimum strength for germicidal purposes. The germicide of this invention has a phenol coefficient of 19, and therefore has a killing strength substantially equal to that of a 5% phenol solution when said germicide is diluted 380 times.

While most germicides may function merely as antiseptics, when highly diluted, but the product most desired is one that is non-corrosive, and one that is readily soluble in water and which will retain its killing strength when in solution and which is highly germicidal without injuring human tissue, and which product also has a healing effect on injured tissue. The caustic nature of most germicides prevents their use in a concentration suitable for effectively destroying resistant bacteria in tissue. These desirable results are obtained by the germicide hereinafter described. By the statement that said germicide is non-corrosive, it is to be understood that the water in the solution will have the same effect on metals as is normal to water.

Briefly described, my germicide product comprises a compound of $FeSO_4$ and $Fe_2(SO_4)_3$ in the proportion of one molecular weight of each, which compound, in solution in water, produces a germicide which may be used in any degree of concentration for direct application to human tissue, whether the tissue is traumatized or not, with no other effect and without injury to the issue and with a pronounced healing effect. The compound is not poisonous, and merely has an emetic action if taken internally in an excessive amount. The preferable minimum strength is in a solution of one part of the product to sixty parts of water.

In crystal form, the compound comprises 10 parts, by weight, of $FeSO_4$ to 15 parts, by weight, of $Fe_2(SO_4)_3$ or in dry powder form, 5 parts, by weight, of $FeSO_4$ to 15 parts, by weight, of $Fe_2(SO_4)_3$.

The phenol coefficient of my compound is 19, and being non-toxic, it is suitable for use intraperitonially, intra-venously, intra-cutaneously and subcutaneously in a dilute solution adapted to accomplish the desired results.

The foregoing results are novel and unexpected, since ferrous sulphate in itself, according to the most recent edition of the United States Dispensatory, and by actual tests, is not germicidal, while ferric sulphate, in itself is so lacking in even antiseptic properties as to be considered worthless.

It is pertinent to note that the addition of any element in the displacement series above that of iron, increases the germicidal properties of my compound, and the sodium in the human tissue, is sufficient to appreciably increase the germicidal properties of the germicide, which result may be also effected by the addition of a small amount of ordinary salt, should the user desire an unusually strong solution for use on surgical instruments or elsewhere. As to the amount of salt that may be added, practically any amount will suffice to increase the ionization, which action is directly related to the germicidal properties. A teaspoonful of salt in five gallons of a solution of any degree of concentration, or a pinch of salt in smaller quantities of the solution is sufficient. In ordinary practice, however, it is obvious that the strength of the compound is more than ample to take care of any condition by varying the concentration of the solution.

It is pertinent to note that the substantially exact ratio of one molecular weight of $FeSO_4$ to one molecular weight of $Fe_2(SO_4)_3$ must be maintained in order to obtain the desired results, which proportion I have expressed in the formula of 10 parts, by weight, of $FeSO_4$, in crystal form, to 15 parts, by weight, of $Fe_2(SO_4)_3$ or if the ferrous sulphate is in dry powder form with the water of crystallization removed, then the ratio is 5 parts, by weight, of $FeSO_4$ to 15 parts by weight, of $Fe_2(SO_4)_3$. The concentration of the solution in which the compound is dissolved is, of course, entirely dependent upon the result desired, as is the question of whether or not the user wishes to add a little sodium, but the percentage of sodium added in any event, need be very small and is optional. Commercially, the compound is produced by me in a solution comprising one part of the compound, by weight, to 60 parts of water, and if a germicide equivalent to a 1:20 phenol solution is desired by the user, said solution is then diluted to the desired degree. The compound may, of course, be used in any suitable carrier, to retain the same on a localized area of tissue.

As a final statement before the claims, I again emphasize the fact that the term "germicide" as used in the claims, refers only to a product with a killing power to micro-organisms at least equal to a 5% solution of phenol, when such product is diluted to the point where it will not injure the human tissue, whether the latter is in the form of an open wound or is unbroken skin.

Having described my invention, I claim:

1. A non-caustic, non-toxic germicide mixture for solution in water comprising $FeSO_4$ and $Fe_2(SO_4)_3$ in the ratio of one molecular weight of each.

2. A non-caustic, non-toxic germicide mixture for solution in water comprising $FeSO_4$ and $Fe_2(SO_4)_3$ in the proportion of 10 parts of $FeSO_4$ to substantially 15 parts of $Fe_2(SO_4)_3$, in which the $FeSO_4$ contains the water of crystallization.

3. A non-caustic, non-toxic germicide mixture for solution in water comprising $FeSO_4$ and $Fe_2(SO_4)_3$ in the proportion of 5 parts of $FeSO_4$ to 15 parts of $Fe_2(SO_4)_3$, in which the $FeSO_4$ is in dry powder form without water.

4. A non-caustic, non-toxic germicidal solution comprising $FeSO_4$ and $Fe_2(SO_4)_3$ in the ratio of one molecular weight of each, dissolved in water.

HOWARD L. GUEST.